United States Patent [19]
Nishizawa et al.

[11] Patent Number: 5,400,983
[45] Date of Patent: Mar. 28, 1995

[54] GAS-PRESSURE ACTUATOR APPARATUS FOR PRETENSIONER

[75] Inventors: Muneo Nishizawa; Mitsuhiko Hiruta, both of Shiga, Japan

[73] Assignee: Takata Corporation, Tokyo, Japan

[21] Appl. No.: 88,857

[22] Filed: Jul. 7, 1993

[30] Foreign Application Priority Data

Jul. 8, 1992 [JP] Japan ................... 4-203249

[51] Int. Cl.⁶ ............................................. B60R 22/46
[52] U.S. Cl. ................................................ 242/374
[58] Field of Search ........ 242/107, 107.4 R, 107.4 A, 242/107.4 B, 374; 280/806; 297/478, 480

[56] References Cited

U.S. PATENT DOCUMENTS

| | | | |
|---|---|---|---|
| 4,927,175 | 5/1990 | Fohl | 280/806 |
| 5,248,110 | 9/1993 | Hiruta et al. | 242/107 |
| 5,310,220 | 5/1994 | Fohl | 280/806 |

*Primary Examiner*—John M. Jillions
*Attorney, Agent, or Firm*—Brumbaugh, Graves, Donohue & Raymond

[57] ABSTRACT

A gas-pressure actuator apparatus having a rotary actuator serving as a driving source for a pretensioner of a seatbelt system, and a gas generator for supplying a working gas to the actuator. The rotary actuator includes a cylinder block and a rotary piston. The cylinder block has a cylinder chamber, a preliminary chamber formed adjacent to the cylinder chamber, and a communicating hole for providing communication between the cylinder and preliminary chambers. The gas generator is attached to the cylinder block in such a manner that a gas outlet for releasing the generated gas opens into the preliminary chamber. The preliminary chamber functions as a gas pressure buffer space for the cylinder chamber and also serves as a capacity element as follows: In the early stage of the rotary piston operation where the volumetric capacity of the pressurizing chamber defined in the cylinder chamber is extremely small, the preliminary chamber lowers the gas pressure applied to the rotary piston. On the other hand, in a state where the volumetric capacity of the pressurizing chamber has become large at the end of the rotary piston operation, the preliminary chamber raises the gas pressure applied to the rotary piston.

5 Claims, 4 Drawing Sheets

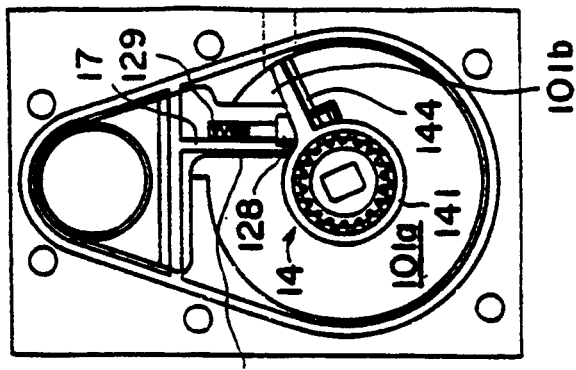
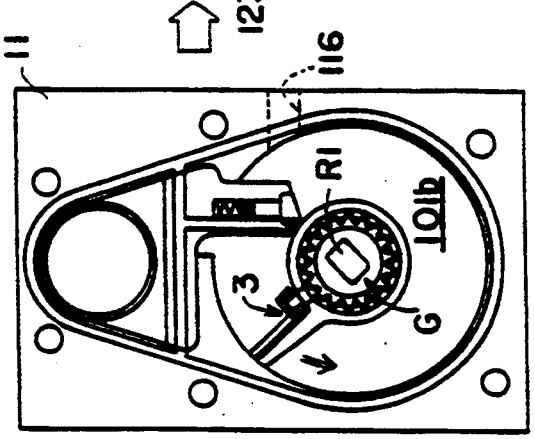
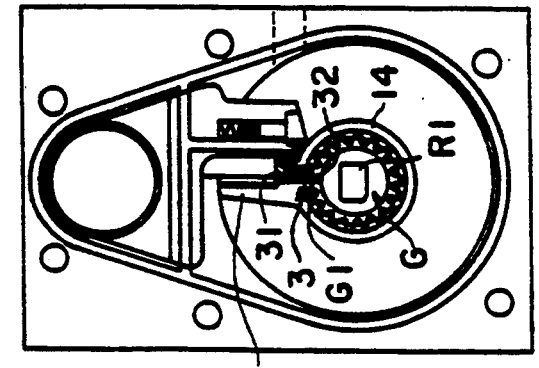
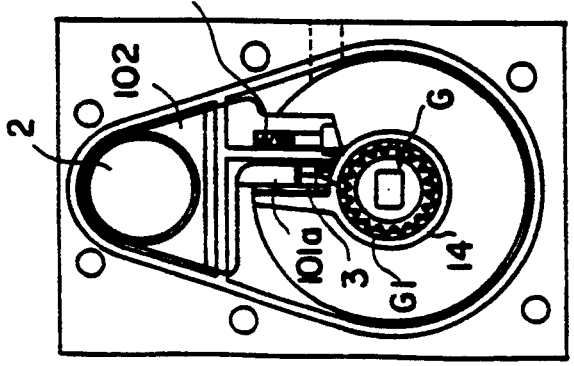

GAS-PRESSURE ACTUATOR APPARATUS FOR PRETENSIONER

BACKGROUND OF THE INVENTION

The present invention relates to a pretensioner for straining a belt of a seatbelt system when an emergency occurs. More particularly, the present invention relates to a gas-pressure actuator apparatus used for such a pretensioner.

Vehicles, for example, automobiles, are provided with a seatbelt system which is designed to restrain the occupant's body to the seat. It has been proposed to attach a pretensioner to the seatbelt system as a means for sensing excessive acceleration that acts on the vehicle when an emergency situation, e.g., a collision, occurs, and for straining the belt which has been loosely fastened to the occupant's body, thereby enhancing the restraining effect. The pretensioner is required to perform a reliable action within an extremely short time. Accordingly, there have been proposed a variety of pretensioners which employ a gas-pressure powered direct-acting actuator as a driving source therefor. There has also been a proposal to employ a gas-pressure powered rotary actuator as a driving source for a pretensioner of the type in which a belt take-up shaft of a retractor is rotated.

In the conventional gas-pressure powered rotary actuator, a gas generator that supplies a working gas to the actuator is disposed in a piston rotor of the actuator and arranged to release the generated gas directly into a cylinder chamber through a communicating hole (see Japanese Patent Application Laid-Open (KOKAI) No. 58-195571). Such disposition of the gas generator is considered to be effective in reducing the size of the rotary actuator.

However, in the rotary actuator having the above-described arrangement, the gas that is generated by a reaction (e.g., combustion) in the gas generator is supplied directly into the cylinder chamber through the communicating hole. Accordingly, the gas pressure that is applied to the cylinder chamber is impulsive, and flames of high-temperature gas reach the cylinder chamber. Therefore, there is likelihood that the pretensioner will operate excessively or fail to operate due to excess load or overheating.

Incidentally, one type of inflator for an air bag system adopts an arrangement in which the gas from the gas generator is supplied into the air bag through a hood (functioning as a gas pressure buffer chamber) (see Japanese Patent Application Post-Exam Publication No. 47-15482). With this arrangement, the above-described problems are solved. However, such an arrangement cannot be used for a pretensioner whose installation space is limited in contrast to the air bag system.

SUMMARY OF THE INVENTION

The present invention has been made in view of the above-described circumstances, and it is an object of the present invention to provide a gas-pressure actuator apparatus for a pretensioner which is designed so that an excessive operation or an operation failure can be avoided by improving the way of supplying a working gas from a gas generator to a rotary actuator for activating the pretensioner without inviting an extra increase in the installation space.

To attain the above-described object, the present invention provides a gas-pressure actuator apparatus having a rotary actuator serving as a driving source for a pretensioner of a seatbelt system, and a gas generator for supplying a working gas to the actuator. The rotary actuator includes a cylinder block and a rotary piston. The cylinder block has a cylinder chamber, a preliminary chamber formed adjacent to the cylinder chamber, and a communicating hole for providing communication between the cylinder and preliminary chambers. The gas generator is attached to the cylinder block in such a manner that a gas outlet for releasing the generated gas opens into the preliminary chamber.

According to the present invention having the above-described arrangement, the preliminary chamber, which is formed adjacent to the cylinder chamber functions as a preliminary space for releasing the impulsive peak pressure of the gas, dynamic pressure and flames of the gas in the early stage of the gas generator operation, thus preventing direct supply of the gas pressure and flames to the cylinder chamber. The gas supply to the cylinder chamber is effected through the communicating hole, which provides communication between the two chambers, after the gas pressure in the preliminary chamber has risen. Accordingly, the preliminary chamber functions as a gas pressure buffer space for the cylinder chamber and also serves as a capacity element as follows: In the early stage of the rotary piston operation where the volumetric capacity of the pressurizing chamber defined in the cylinder chamber is extremely small, the preliminary chamber lowers the gas pressure applied to the rotary piston. On the other hand, in a state where the volumetric capacity of the pressurizing chamber has become large at the end of the rotary piston operation, the preliminary chamber raises the gas pressure applied to the rotary piston. The action of leveling the gas pressure in the pressurizing chamber minimizes the leakage of gas from the actuator due to the application of an excessively high pressure to the pressurizing chamber and also prevents application of an impulsive excess load to the associated mechanical part.

According to the present invention, the preliminary chamber is provided to level out the gas pressure applied to the cylinder chamber of the rotary actuator. Accordingly, it is possible to prevent application of an impulsive excess load to the associated mechanical part which would otherwise occur because a high-pressure and high-temperature gas is supplied directly to the cylinder chamber in the early stage of the gas generator operation. It is also possible to minimize the leakage of gas from the cylinder chamber. Particularly, the arrangement in which the preliminary chamber is disposed adjacently to the cylinder chamber and within the plane of rotation of the rotary piston makes it possible to prevent an increase in the axial length of the cylinder block. Thus, it is possible to provide a gas-pressure actuator apparatus which is suitable for a pretensioner whose installation space is limited.

BRIEF DESCRIPTION OF THE DRAWINGS

FIG. 3(A–D) illustrates the operation of the gas-pressure actuator apparatus of the first embodiment.

DETAILED DESCRIPTION OF THE PREFERRED EMBODIMENTS

Figure 1:
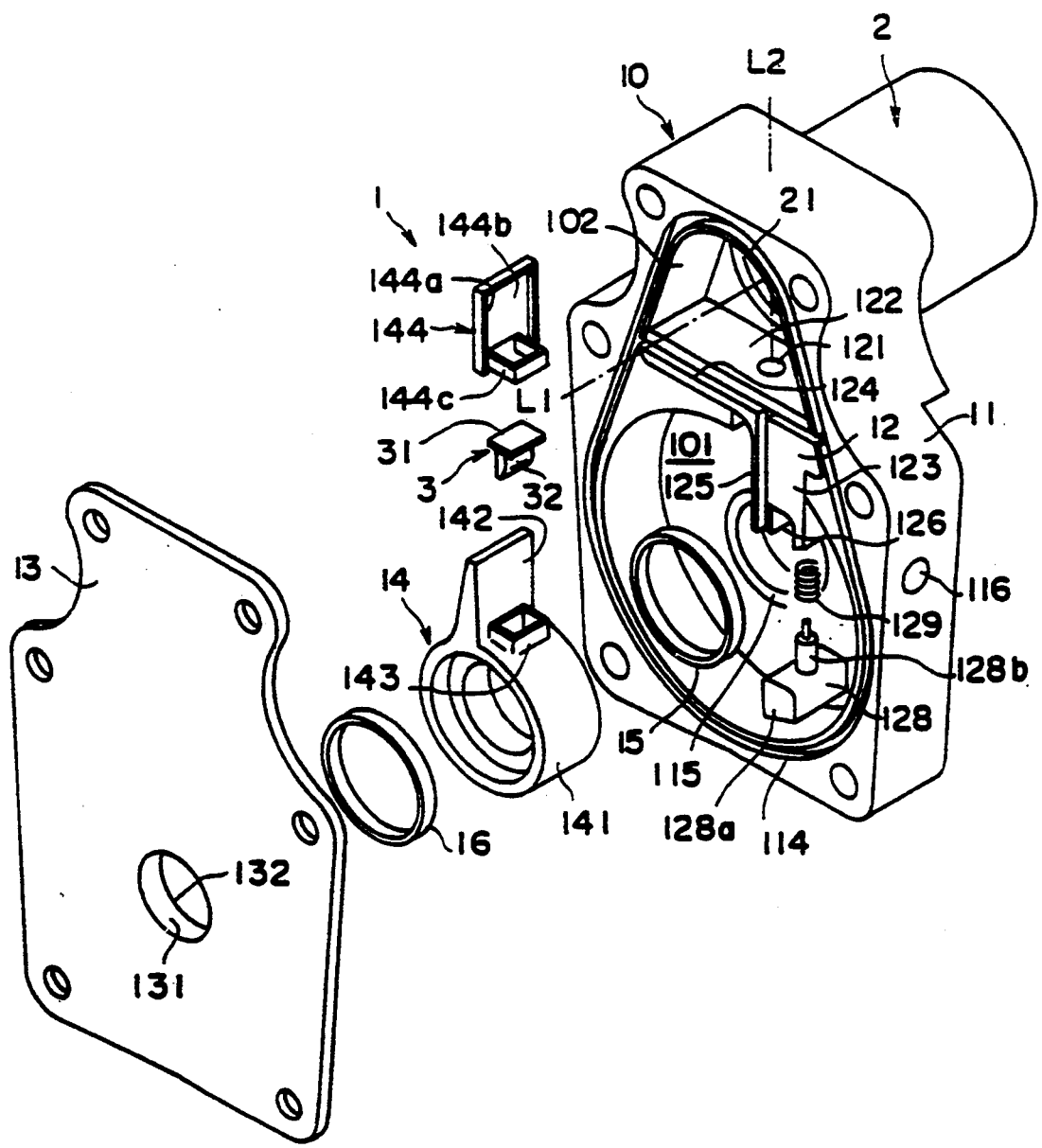
FIG. 1 is an exploded perspective view showing a gas-pressure actuator apparatus according to a first embodiment of the present invention.
Figure 2:
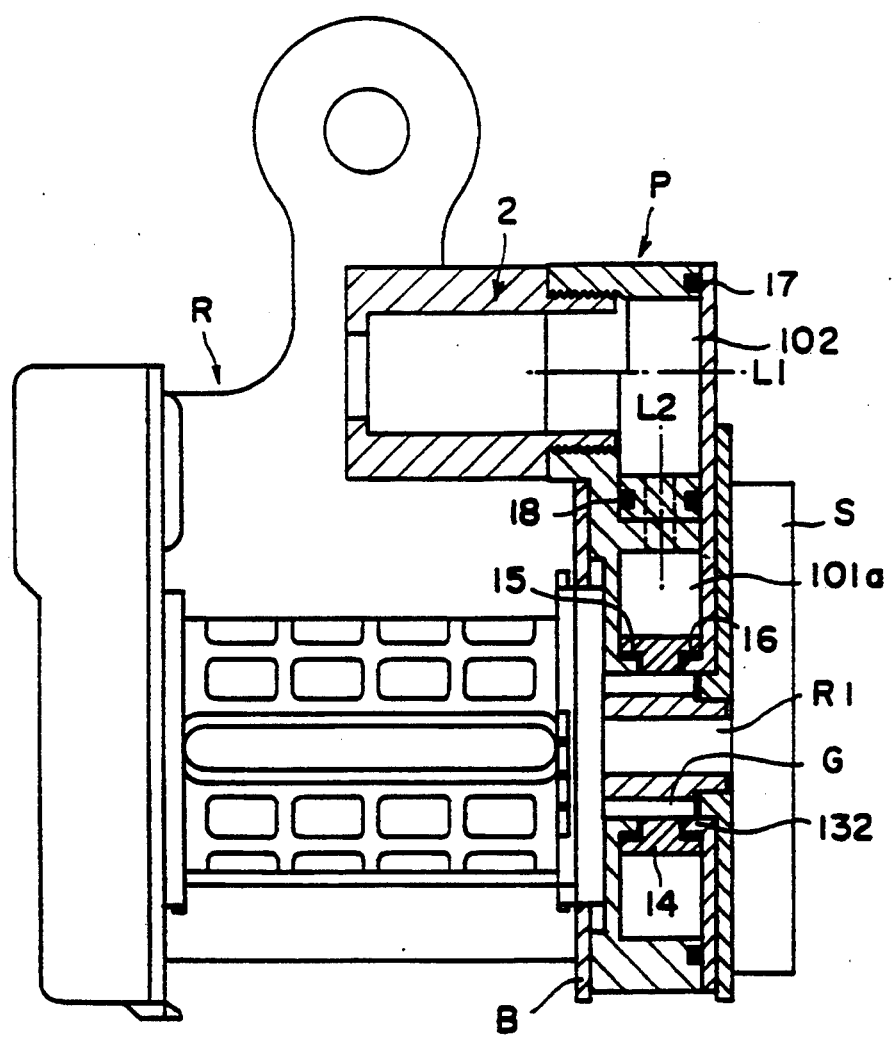
FIG. 2 is an axial sectional view showing the gas-pressure actuator apparatus of the first embodiment, together with a retractor.

Embodiments of the present invention will be described below with reference to the accompanying drawings. FIGS. 1 to 3 show a first embodiment in which the actuator apparatus of the present invention is applied to a pretensioner designed to rotate a retractor shaft. First, the arrangement of the embodiment will be outlined below. The apparatus constitutes a gas-pressure actuator apparatus having a rotary actuator 1 and a gas generator 2 that supplies a working gas to the rotary actuator 1. The rotary actuator 1 includes a cylinder block 10 and a rotary piston (referred to simply as "piston" in the following description of the embodiment) 14. The cylinder block 10 has a cylinder chamber 101, a preliminary chamber 102 formed adjacent to the cylinder chamber 101, and a communicating hole 121 for providing communication between these chambers. The gas generator 2 is attached to the cylinder block 10 in such a manner that a gas outlet 21 for releasing the generated gas opens into the preliminary chamber 102. The communicating hole 121 and the gas outlet 21 are disposed with their axes L1 and L2 intersecting each other.

Each part of the apparatus will be explained below more specifically. As shown in FIG. 1, the cylinder block 10 in this embodiment includes a body 11, a partition block 12, and a lid 13. The body 11 is formed with a cylinder chamber 101 one side of which is open and which is surrounded by a cylindrical peripheral wall and a side wall, and a preliminary chamber 102 one side of which is similarly open and which is surrounded by an arched peripheral wall and a side wall. The preliminary chamber 102 is adjacent to the cylinder chamber 101 with the partition block 12 interposed therebetween. Screw receiving holes are formed in predetermined portions (six in the illustrated example) of the body 11 for securing the apparatus to the base of the retractor. In this embodiment, the peripheral wall of a portion where the cylinder chamber 101 and the preliminary chamber 102 face each other is cut over about a half the length, and this cut portion is shielded with the partition block 12, which is a separate member. The body 11 is further formed with a seal groove 114 surrounding the outer peripheries of the cylinder chamber 101 and the preliminary chamber 102. In addition, the body 11 is provided with an annular flange 115 which projects into the cylinder chamber 101 from the side wall thereof so as to surround a shaft receiving hole, and an exhaust opening 116 which opens the cylinder chamber 101 to the outside of the body 11.

The partition block 12 is attached to the flat peripheral wall of the preliminary chamber 102 and has a partition 122 crossing the two chambers 101 an 102, and a partition 123 intersecting the partition 122. One end face of the partition block 12 is formed with intersecting seal grooves 124 and 125 which extend parallel to the two partitions 122 and 123, respectively. It should be noted that the reverse side of the partition block 12 is also formed with seal grooves similar to the above (see FIG. 2, described later; in the figure, only a groove corresponding to the seal groove 124 is shown). Further, the partition 122 is formed with a communicating hole 121 extending through it. The distal end of the partition 123 is formed with a cut portion 126 for fitting a seal member. The bottom of the cut portion 126 is formed with a spring accommodating hole (see FIG. 3, described later). In the cut portion 126 is disposed a seal member 128 for sealing the area between the distal end of the partition 123 and the outer peripheral surface of a ring portion 141 of a piston 14. The seal member 128 is pressed on the outer peripheral surface of the ring portion 141 by a coil spring 129.

The lid 13 is formed in a plate-shaped configuration having a profile similar to that of the body 11. The lid 13 is formed with screw receiving holes corresponding to those of the body 11 in close proximity to the peripheral edge thereof. In addition, a shaft receiving hole 131 is formed in the center of the lid 13, and an annular flange 132 (see FIG. 2) is formed so as to surround the shaft receiving hole 131. The annular flange 132 projects into the cylinder chamber to face the annular flange 115.

Next, the piston 14 has a ring portion 141 which defines an engagement space surrounding the outer periphery of a ratchet wheel G (see FIG. 2) inside the cylinder chamber 101 and which constitutes a portion through which the piston 14 is rotatably supported by the cylinder block 10, and a vane 142 radially extending from the ring portion 141 to function as a pressure-receiving portion. A guide cylinder 143 in the form of a square cylinder is provided at the rear of the vane 142 to fit a ratchet 3 (described later) thereinto.

An elastomeric seal member 144 is disposed on the pressure-receiving side of the vane 142. The seal member 144 is formed with a support portion 144b having a continuous seal lip 144a extending along both side edges and an end edge, and a fitting portion 144c fitted to the outer side of the ratchet guide cylinder 143. The seal lip 144a is brought into press contact with the two side surfaces (one of them is the side surface of the lid 13) and the peripheral surface of the cylinder chamber 101 by the gas pressure when the piston 14 rotates, thereby sealing the gap between the body 11 and the lid 13 on the one hand and the piston 14 on the other. The upper surface of the fitting portion 144c and a part of the support portion 144b come in elastic contact with a pressure-receiving head 31 of the ratchet 3 (described later), thereby sealing the opening of the ratchet guide cylinder 143.

A ratchet 3 is inserted into the opening of the guide cylinder 143 in such a manner that it is movable radially of the piston 14. The ratchet 3 constitutes an actuator-side engaging means of the engagement mechanism. The ratchet 3 has a pressure-receiving head 31 that receives the gas pressure, and a wedge-shaped pawl 32 constituting an engagement portion which is engageable with the ratchet wheel G. The ratchet 3 is disposed with the pawl 32 facing toward the ratchet wheel G.

The seal member 128 has a wedge-shaped body 128a, and a guide shaft 128b which extends from the body 128a to fit into the spring accommodating hole. The distal end of the body 128a constitutes a sliding contact seal which is in press contact with the outer peripheral surface of the ring portion 141 of the piston 14.

In this embodiment, a pair of bearing rings 15 and 16, which are arranged as separate members, are disposed in the support portions of the piston 14 so that the piston 14 is rotatably supported in the cylinder 10. These bearing rings have an inner diameter with which the bearing rings 15 and 16 can fit onto the respective annular flanges 115 and 132 projecting into the cylinder chamber 101 of the cylinder 10, and an outer diameter with which the bearing rings 15 and 16 can be fitted to the inner peripheral portion of the ring portion 141 of the piston 14. Accordingly, in the assembled state as shown in FIG. 2, the piston 14 is supported at the inner peripheral surface thereof on the outer peripheral surfaces of the two annular flanges 115 and 132 through the two bearing rings 15 and 16.

In addition, two 0-ring shaped elastomeric seals 17 and 18 (see FIG. 2) are disposed in the actuator 1. These seals 17 and 18 are fitted into the seal grooves 114, 124 and 125 and seal grooves formed at the reverse sides of the seal grooves 114, 124 and 125 correspondingly thereto, thereby sealing the area between the body 11 and the lid 13, the area between the preliminary chamber 102 and the cylinder chamber 101, and the area between a pressurizing chamber 101a and a backpressure chamber 101b.

The gas-pressure actuator apparatus, arranged as described above, is attached to one side of the base B of the retractor R to serve as a driving apparatus that rotates the take-up shaft of the retractor R, as shown in FIG. 2. The apparatus cooperates with a clutch mechanism to constitute a pretensioner P. In this embodiment, the clutch mechanism is formed from the ratchet wheel G, which has rack teeth formed on the outer periphery thereof and which is fitted to a square shaft portion of the take-up shaft R1 projecting from the base B of the retractor R, and the ratchet 3 which comes in and out of engagement with the ratchet wheel G. It should be noted that a spring unit S for winding up the retractor R is disposed on the outer side of the pretensioner P.

Next, the operation of the above-described embodiment will be explained. FIG. 3 shows the operation of the pretensioner P arranged as described above. When the apparatus is in an inoperative position, the piston 14 lies in the position shown in FIG. 3(A). In this state, the pressurizing chamber 101a is in the most contracted state. The ratchet 3 is set in a position where it does not engage with an engagement tooth G1 on the outer periphery of the ratchet wheel G by using a shear pin or other proper means. Accordingly, the take-up shaft R1 is completely disengaged from the piston 14. Thus, the function of the retractor R is maintained as in the conventional practice.

If the gas generator 2 is activated by a known means, e.g., an electric signal, and the gas generated is released from the gas generator 2 into the preliminary chamber 102, the pressure in the preliminary chamber 102 rises. Eventually, the high-pressure gas is introduced into the pressurizing chamber 101a through the communicating hole 121. Since the axis L1 in the direction in which the high-temperature gas is released from the gas generator 2 and the axis L2 of the communicating hole 121 are in intersecting relation to each other, it is possible to prevent gas flames from blowing directly into the pressurizing chamber 101a. The ratchet 3 receives the gas pressure introduced into the pressurizing chamber 101a at the pressure-receiving head 31, thereby being pushed radially inward. Thus, the ratchet 3 is displaced to the position shown in FIG. 3(B). At this time, the pawl 32 fits to the root of an engagement tooth G1 of the ratchet wheel G. Thus, the piston 14 is engaged with the ratchet wheel G through the ratchet 3. At this point of time, the take-up shaft R1 is connected to the actuator 1.

In the meantime, the gas pressure also acts on the vane 142 of the piston 14 so as to push the vane 142. Accordingly, the piston 14 rotates about its axis counter-clockwise, as shown by the arrow in FIG. 3(C). The pressure that is generated in the backpressure chamber 101b as the piston 14 rotates is released into the atmosphere through the exhaust opening 116 formed in the body 11, thereby preventing occurrence of resistance due to a rise in the pressure in the backpressure chamber 101b. Thus, the rotational force of the piston 14 is transmitted to the take-up shaft R1 through the ratchet 3 and the ratchet wheel G.

As the take-up shaft R1 rotates in this way, the belt is wound up onto the take-up shaft R1. Thus, pretension is applied by straining of the belt. Eventually, the piston 14 reaches the position shown in FIG. 3(D), thus completing the pretension application operation.

During the above-described series of operations, the seal member 128 is continuously pressed on the outer peripheral surface of the ring portion 141 of the piston 14 under the spring load applied from the coil spring 129. Therefore, it is possible to prevent the gas from escaping from the pressurizing chamber 101a to the backpressure chamber 101b through the gap between the distal end of the partition 123 and the ring portion 141.

In the meantime, leakage of gas through the gaps between the two side surfaces of the partition 123 on the one hand and the end wall of the body 11 and the lid 13 on the other is prevented by the pair of elastomeric seals 17 and 18 fitted into the seal groove 114 and the seal groove provided at the reverse side thereof. Leakage of gas through the gap between the vane 142 and the cylinder 10 is prevented by the seal lip 144a of the elastomeric seal member 144. Further, leakage of gas from the opening of the ratchet guide cylinder 143 to the engagement space is prevented by the fitting portion 144c of the elastomeric seal member 144.

According to the gas-pressure actuator apparatus of this embodiment, the clutch mechanism (the ratchet 3 and the ratchet wheel G), the cylinder chamber 101 and the preliminary chamber 102 are disposed within the same plane. Accordingly, it is possible to reduce the axial dimension of the retractor, including the pretensioner, in comparison to the conventional gas-pressure actuator apparatus in which the clutch mechanism is disposed in coaxial side-by-side relation to the cylinder chamber. Moreover, since the gas generator 2 is disposed with the axis thereof extending parallel to the axis of the retractor R and laid on one side of the gas-pressure actuator apparatus, the overall external shape of the retractor R, including the pretensioner P, can be neatly arranged.

Figure 4:
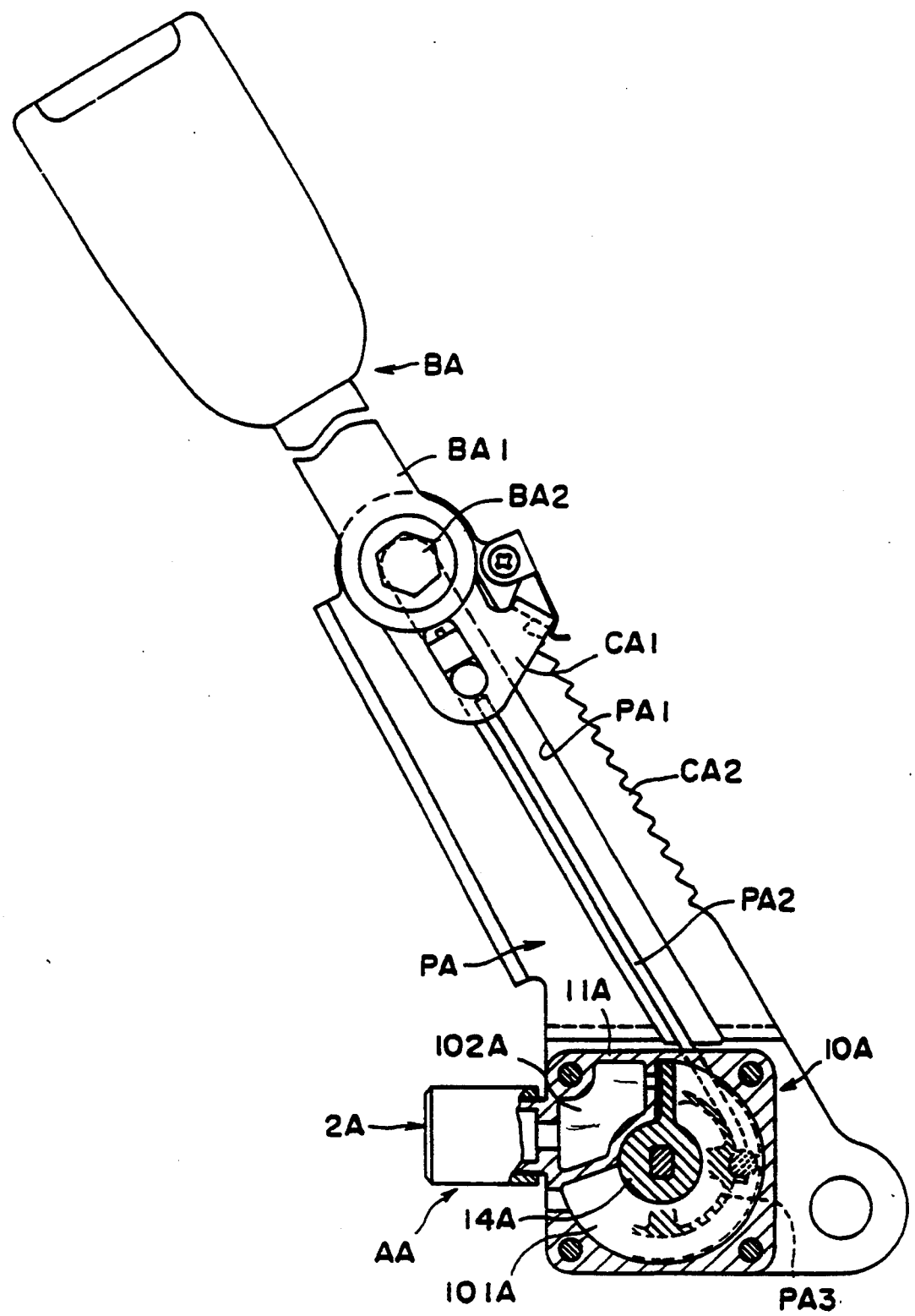
FIG. 4 is a partly-sectioned side view of a second embodiment in which the gas-pressure actuator apparatus of the present invention is applied to a buckle pretensioner.

Next, a second embodiment of the present invention will be explained. FIG. 4 shows a second embodiment in which the present invention is applied to a pretensioner that pulls down a buckle. The gas-pressure actuator apparatus in this embodiment is essentially similar to that of the first embodiment, but it is different from the above-described apparatus in the position where the preliminary chamber 102A is formed and in the direction in which the gas generator 2A is attached. In this embodiment, the preliminary chamber 102A is formed in a segmental space defined by a sectorial cylinder chamber 101A. The gas generator 2A is attached to the peripheral wall of the body 11A with the axis thereof offset from the axis of the cylinder block 10A. It should be noted that detailed description of the arrangement of the second embodiment is omitted, and that in FIG. 4 reference symbol PA denotes a pretensioner base, AA a gas-pressure actuator apparatus attached to the pretensioner base PA, BA a buckle having a base portion BA1 thereof slidably supported by the pretensioner base PA through a bolt BA2, PA1 a sliding guide groove for the bolt BA2, CA1 a lock pawl rotatably supported by the bolt BA2, PA2 a wire rope connecting together the lock pawl CA1 and a pulley PA3 attached to the piston 14A of the gas-pressure actuator apparatus, and CA2 a rack which comes in and out of engagement with the lock pawl CA1.

Since the operation of the gas-pressure actuator apparatus in this buckle pretensioner is similar to that in the first embodiment, detailed description thereof is omitted. The operation of pulling down the buckle will be roughly explained below. When the pulley PA3 rotates in response to the rotation of the piston 14A, the wire rope PA2, which is attached at one end thereof to the pulley PA3, is pulled down, so that the buckle BA is pulled down through the lock pawl CA1 and the bolt BA2, which are engaged with the other end of the wire rope PA2. The return movement of the buckle BA is prevented by the engagement between the lock pawl CA1 and the rack CA2.

According to the gas-pressure actuator apparatus of this embodiment, since the preliminary chamber 102A is formed in the segmental space defined by the sectorial cylinder chamber 101A, the cylinder portion of the gas-pressure actuator apparatus can be arranged in an extremely compact form.

Although the present invention has been described above by way of two embodiments, it should be noted that the present invention is not necessarily limited to the described embodiments and that various changes and modifications may be imparted to the specific arrangement of each part of the embodiments without departing from the scope of the invention which is limited solely by the appended claim.

What is claimed is:

1. A gas-pressure actuator apparatus for a pretensioner for a seat belt system comprising a rotary actuator serving as a power source for the pretensioner and a gas generator for supplying a working gas to the rotary actuator, the rotary actuator having a cylinder block defining a cylinder chamber and a preliminary chamber separated by a common partition wall, the partition wall having a hole communicating the preliminary chamber with the cylinder chamber, and the rotary actuator having a rotary piston received in the cylinder chamber for rotation about an axis, and the gas generator being attached to the cylinder block in a manner such that a gas outlet of the gas generator opens into the preliminary chamber, the preliminary chamber having a volume relative to the size of the hole such that gas under a pressure higher than that in a pressurized portion of the cylinder chamber is stored in the preliminary chamber, which serves as a buffer space and a capacity element so that in the early stages of the operation of the rotary actuator when the size of the pressurized portion of the cylinder chamber is small gas from the gas generator is stored in the preliminary chamber and as the size of the pressurized portion increases in the later stages of operation of the rotary actuator gas stored in the preliminary chamber is released to the pressurized portion, whereby the preliminary chamber has the effect of leveling out the pressure in the pressurized portion of the cylinder chamber of the actuator during its operation.

2. A gas-pressure actuator apparatus according to claim 1 wherein the preliminary chamber is substantially coextensive with the cylinder chamber in the axial direction with respect to the axis.

3. A gas-pressure actuator apparatus according to claim 1 wherein the partition wall is a circumferential wall of the cylinder chamber.

4. A gas-pressure actuator apparatus according to claim 1 wherein the partition wall is a radial wall of the cylinder chamber.

5. A gas-pressure actuator apparatus according to claim 1 wherein the gas outlet of the gas generator opens into the preliminary chamber such that an axis along which the gas is released from the gas generator into the preliminary chamber intersects the axis of the hole, whereby gas flames are prevented from flowing directly into the pressurized portion of the cylinder chamber through the hole.

* * * * *